United States Patent [19]
Johnson

[11] 3,832,038
[45] Aug. 27, 1974

[54] HAND RETROVIEWER

[75] Inventor: Edgar G. Johnson, Maplewood, Minn.

[73] Assignee: Minnesota Mining Manufacturing Company, St. Paul, Minn.

[22] Filed: Aug. 9, 1972

[21] Appl. No.: 278,990

[52] U.S. Cl. ...................... 350/236, 351/6, 350/105
[51] Int. Cl. ........................................... G02b 27/02
[58] Field of Search ....................................... 351/6; 350/235–239, 169, 173, 105, 97

[56] References Cited
UNITED STATES PATENTS

| | | | |
|---|---|---|---|
| 2,448,140 | 8/1948 | Bonaventura | 351/6 |
| 2,944,463 | 7/1960 | Rantsch | 350/236 |
| 3,331,688 | 7/1967 | Altman | 350/105 |

*Primary Examiner*—Ronald L. Wibert
*Assistant Examiner*—Michael J. Tokar
*Attorney, Agent, or Firm*—Alexander, Sell, Steldt & Delahunt

[57] ABSTRACT

A hand retroviewer for use in verifying a document having a retro-reflective image bearing layer which is substantially transparent under ordinary diffuse light viewing conditions to provide viewing of images on an underlying surface. The viewer housing has a viewing passageway therethrough and a beam splitter having a specular reflectance of at least 60 percent is mounted in the viewing passageway. A lamp and a condensing lens which combine to produce a virtual image of the light source that has an area less than .5 square inch are positioned to transmit light to the beam splitter. Light reflected from the beam splitter is retro-reflected from the image bearing layer of a document held spaced from the viewer along the illumination axis and a portion of the retro-reflected light is transmitted through the beam splitter for viewing to verify the document by its retro-reflected image.

8 Claims, 4 Drawing Figures

PATENTED AUG 27 1974

3,832,038

HAND RETROVIEWER

FIELD OF THE INVENTION

The present invention relates to a hand retroviewer for viewing a retro-reflective image contained on a document in a layer which is substantially transparent under diffuse light viewing conditions.

BACKGROUND OF THE INVENTION

Counterfeiting of identification cards, passports, driver's licenses, credit cards, stock certificates and the like is a very serious problem resulting in the loss to businessmen and individuals of many millions of dollars each year. Many of these documents are easy to falsify and detection of the falsification has been nearly impossible for untrained personnel such as clerks, tellers, etc.

Recently, however, a legend containing, substantially transparent, retro-reflective sheet material has become available to the manufacturers or distributors for bonding to documents to verify the authenticity of an original document. Such sheet material has both retro-reflective legend areas and retro-reflective background areas that are substantially transparent and indistinguishable under ordinary diffuse light viewing conditions and that are effectively opaque and clearly distinguishable under retro-reflective viewing conditions inasmuch as either the background or the legend is a more efficient retro-reflector. The sheet material includes a monolayer of glass microspheres of at least 1.8 refractive index having a partially light-transmissive mirror in optical connection with the rear surfaces of the beads, the retro-reflective efficiency differing in the legend and the background areas. Under daylight conditions the sheet appears either to be free of a legend or to have only a legend too faint to obscure the visual information on the document to which it is bonded; for example, if the sheet is affixed over a photograph, the photograph remains visible to the observer, and one hardly notices the presence of the covering retro-reflective sheet or the legend thereon. Yet, when viewed along a path of collimated light, even though the entire structure is retro-reflective and the photograph is thereby obscured, the legend is made quite visible because of a difference in retro-reflective efficiency between the legend areas and the background areas of the sheet material.

The legend or image in the retro-reflective layer may be different for each manufacturer or distributor of documents. Generally, the legends are smaller than the documents to which the retro-reflective material is to be laminated and they are arranged in a repetitive pattern. Cutting of the retro-reflective image bearing sheet from a continuous roll for lamination on a document provides a random distribution of the legends or images in the retro-reflective layer thereby making tampering therewith (e.g. exchanging of photographs on driver's licenses) virtually impossible. Furthermore, duplication of the transparent retro-reflective sheet material requires expensive equipment and much technical know-how thereby further deterring counterfeiting of the protected documents.

A document protected with the retro-reflective sheet material as described above preferably has the legends with a greater retro-reflectance than the background areas of the retro-reflective layer. Such a document has a retro-reflectivity in the background areas of the retro-reflective layer at least twice as great as can be obtained by any other known method of producing a retro-reflective legend visible against a retro-reflective background.

U.S. Pat. application Ser. No. 240,132 filed on Mar. 31, 1972, and assigned to the assignee of the present application, discloses a table retro-viewer which can be used by an inexperienced person to consistently detect a counterfeit document without risking false accusation and embarrassment of a customer having a properly verified document. However, the design considerations for a hand retroviewer are quite different than those for a table viewer because the document is to be held in the hand and exposed to the ambient light and the viewer light source size and power output are quite limited. Until now, a hand retroviewer obtaining the results of the table retroviewer has not been available.

SUMMARY OF THE INVENTION

According to the present invention there is provided a hand retroviewer for use in verifying a document having a retro-reflective image bearing layer which is substantially transparent under diffuse light viewing conditions to provide viewing of images on an underlying surface. The viewer includes a housing formed with a body defining a handle and a head extending from one end of the body, the head being formed with a viewing passageway therethrough. A lamp providing a light source and a condensing lens which combines therewith to produce a virtual image of the light source that has an area less than 0.5 square inch are mounted in the housing. A beam splitter having a specular reflectance of at least 60 percent at the angle of incidence of light transmitted thereto by the lens is mounted in the viewing passageway through the head of the housing to reflect through the viewing passageway a portion of the light transmitted by the lens and to transmit through the viewing passageway a portion of any light reflected by said beam splitter and thereafter retro-reflected from a document.

THE DRAWING

Figures 1, 2:
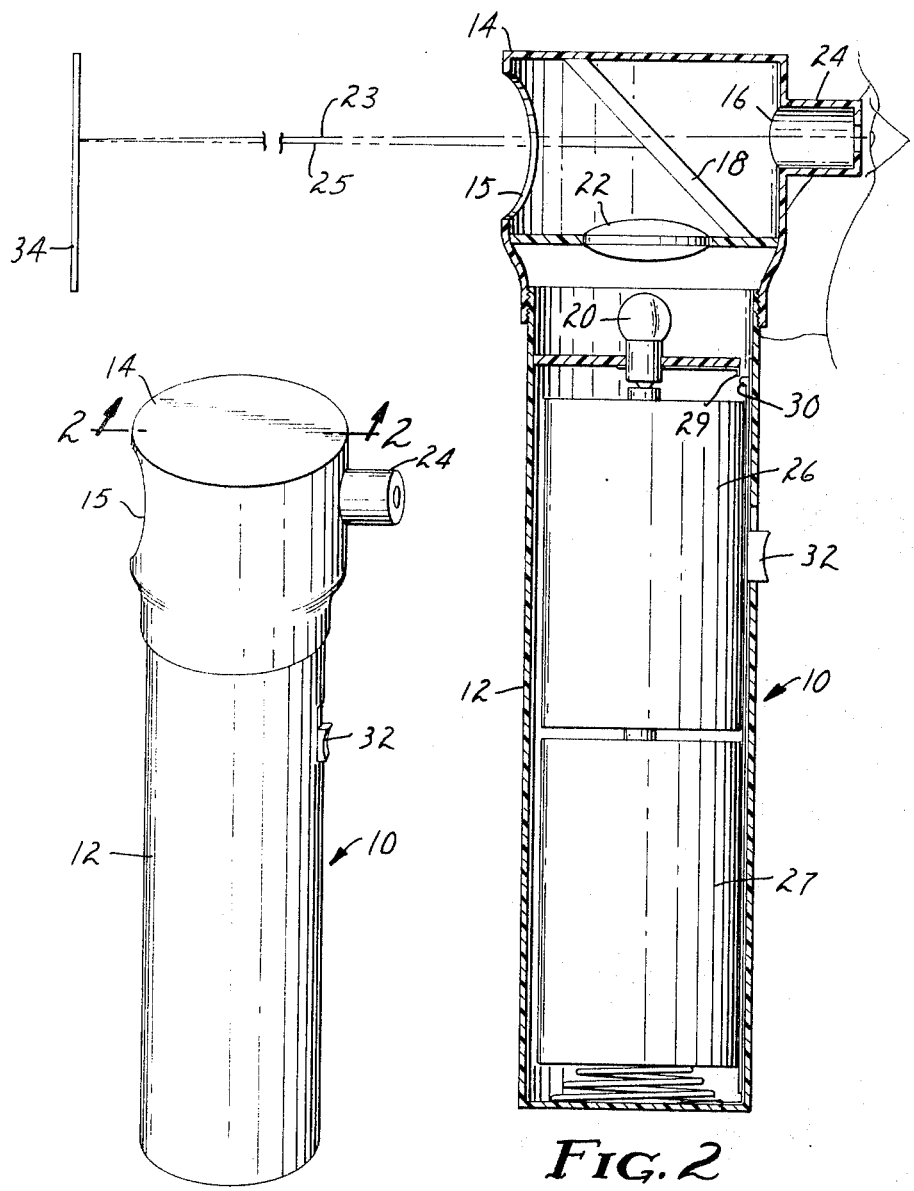
FIG. 1 is a perspective view showing the top and side of a hand retroviewer constructed in accordance with the present invention.
FIG. 2 is a cross-sectional view taken generally along line 2—2 of FIG. 1.

The hand retroviewer of the present invention is constructed for verification of an identification document held in one hand spaced forward from the viewer and exposed to typical indoor illumination levels of 50 to 150 footcandles while the viewer is held up to the user's eye by his other hand. The viewer includes a housing 10 formed with a tubular body 12 defining a handle, and a head 14 extending from one end of the body. The head 14 is formed with a viewing passageway therethrough with its axis perpendicularly intersecting the axis of the body 12; the ends of the passageway being designated 15 and 16.

A beam splitter 18 is mounted in the head 14 to intersect the axis of the viewing passageway 15, 16 centrally of the beam splitter and at a 45° angle. The beam splitter has a specular reflectance of at least 60 percent at a 45° incidence angle.

A lamp 20 is mounted in the body 12 of the housing 10 on the axis of the body to provide a light source, which in the illustrated embodiment is the filament of the lamp 20. A condensing lens 22 is mounted centrally in the head 14 coaxially with the body 12. The lamp 20 and the condensing lens 22 form an optical combination which produces a virtual image of the light source that has an area less than 0.5 square inch and being positioned with the optical axis of the combination perpendicularly intersecting the axis of the viewing passageway 15, 16 through the head 14 centrally of the beam splitter 18. The condensing lens 22 preferably has a speed greater than $f/2$.

An eyepiece 24 is secured to the head 14 of the housing 10 over one end 16 of the viewing passageway 15, 16 therethrough to position the eye of the user at a predetermined viewing position. The viewing position defined by the eyepiece 24 is spaced the same distance from the beam splitter as is the virtual image of the light source. And, the eyepiece 24 is preferably secured to the head 14 to position the eye of a user along a viewing axis 23 at an angle of divergence from the illumination axis 25 defined by the lamp 20, the lens 22 and the beam splitter 18 of from 0.2° to 2°.

A pair of batteries 26 and 27 in the body 12 of the housing 10 provide a source of electrical energy for the lamp 20. A pair of normally open electrical contacts 29 and 30 may be closed by depression of a button 32 protruding through an aperture in the body 12 to close the electrical circuit through the lamp 20 and the batteries 26 and 27 to light the lamp 20.

Figure 3:
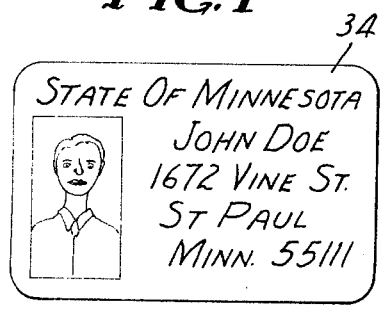
FIG. 3 is a front view of a properly validated identification card under normal diffuse light viewing conditions.
Figure 4:
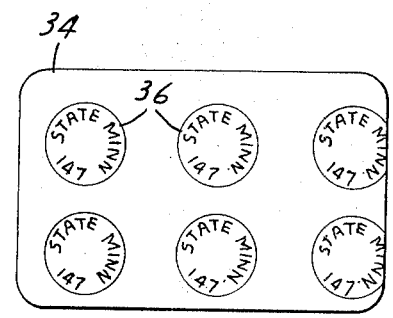
FIG. 4 is a front view of the card of FIG. 3 as it appears under retro-reflective viewing conditions through the hand retroviewer of FIG. 1.

The illustrated hand retroviewer is particularly useful for verification of identification cards which people normally carry with them, for example driver's licenses. FIG. 3 illustrates a properly validated identification card 34 under normal diffuse light viewing conditions with the name, address, and picture of the holder thereof for identification. FIG. 4 illustrates the retro-reflective images on the same card 20 showing the proper retro-reflective legends 36 and the proper retro-reflective background which obscures the underlying identification.

As aforementioned, to provide adequate verification of documents, the retroviewer must cause the identification images of a valid card to be washed out with the retro-reflective background while at the same time detecting counterfeit documents under the typical illumination levels of 50 to 150 footcandles. The size limitation necessary to achieve a hand retroviewer and the low powered light sources that can be used in them restricts the size of the virtual image of the light source to less than 0.5 square inch even when magnified by a strong Fresnel condensing lens. It has, therefore, not been possible to apply the invention of copending U.S. Pat. application Ser. No. 240,132 filed on Mar. 31, 1972, to obtain a useful hand retroviewer.

It has now been found that beam splitters with specular reflectances of from 60 percent to 90 percent at the angle of incidence of light transmitted thereto by the condensing lens 22 with accompanying direct transmittances of at least 0.2 percent achieve proper discrimination by balancing the retro-illumination against the typical indoor illumination level of 50 to 150 footcandles while providing sufficient transmittance for clear viewing. Retroillumination is that light which is incident on the card 34 in a direction which is close enough to the viewing direction to be retroreflected to the observer. Retroluminance is the product of retroillumination and retroreflectance just as diffuse luminance is the product of illumination and diffuse reflectance.

It has further been found that when the illumination axis 25 defined by the lamp 20, the lens 22 and the beam splitter 18 through the head viewing passageway 15, 16 is coincident with the viewing axis 23, the proper balance between internal and external illumination severely depends upon the distance at which the card 34 is held for examination. The retro-luminance of a validated card 34 increases as the viewing distance decreases while the diffuse luminance is nearly independent of viewing distance. Thus a viewer that has been designed to show the proper balance at 12 inches will cause the card 34 to have too much retroluminance at six inches and too little at eighteen inches. It has also been found that when the eyepiece 24 is positioned to place the viewing axis 23 at a divergence angle to the illumination axis 25 of from 0.2° to 2° and balanced for viewing at 12 inches it remains in balance even though the viewing distance may be increased or decreased. Apparently this is because the change in retroreflectance of a valid card 34 with decreased (increased) divergence angle compensates for the decrease (increase) in retroillumination level. However, off-axis retroreflectance levels are less than on-axis or 0° divergence retroreflectance levels. Thus, to limit the requirement for retroillumination while attaining balanced retroluminance and diffuse luminance levels when viewing a card 34 at distances from six inches to 18 inches a 0.4° to 0.6° divergence angle has been found to be most preferred. Furthermore, to attain sufficient retroillumination it has been found preferable to use a condensing lens 22 having a speed of $f/2$ or greater.

In specific examples of the hand retroviewer of the present invention the lamp was a GE14 flashlight bulb powered by two 1.5 volt flashlight batteries. A 15 millimeter diameter, 29 millimeter focal length simple condensing lens was used. The viewing angle of divergence was made 0.5° and beam splitters having reflectances (at 45° incidence) of 68, 73, 79, 82, 86 and 90 percent were utilized. Each of the hand retroviewers provided good verification and discrimination with documents held under 100 footcandle indoor lighting.

In use, a card 34 is held in one hand while the retroviewer is held up to the eye as illustrated in FIG. 2. The switch button 32 is depressed to provide power to the lamp 20. Light from the lamp passes through the condensing lens 22 and a portion thereof is reflected by the beam splitter 18 through the viewing passageway 15, 16 forwardly onto the card 34. Light reflected onto the card by the beam splitter 18 is retro-reflected by the legends 36 and the background areas of the retro-reflective layer of the card. A portion of the retro-reflected light is transmitted rearwardly through the viewing passageway 15, 16 and the beam splitter to the operator's eye positioned at the eyepiece 24. If the card is properly validated it will appear as in FIG. 4 with the retro-reflective legend standing out from the retro-reflective background, both of which obscure the identification images therebelow.

I claim:

1. A hand retroviewer for use in verifying a document under ambient lighting conditions typical of indoor illumination levels, said document having a retro-reflective image bearing layer which is substantially transparent under diffuse light viewing conditions, comprising:

a housing formed with a body defining a handle and a head extending from said body, said head being formed with a viewing passageway therethrough, a lamp mounted in said housing to provide a light source, a condensing lens mounted in said housing and positioned to collect and transmit light from said lamp, said lamp and said lens combining to produce a virtual image of the light source that has an area less than 0.5 square inch, and a beam splitter mounted in said viewing passage through said head inclined to the optical axis of said lamp and said lens to reflect through said viewing passageway a portion of the light transmitted by said lens and to transmit through said viewing passageway a portion of any light reflected by said beam splitter and thereafter retro-reflected from a said document, said beam splitter having a specular reflectance of at least 60 percent at the angle of incidence of light transmitted thereto by said lens.

2. The hand retroviewer of claim 1 including an eyepiece secured to said head of said housing over one end of said viewing passageway therethrough for positioning the eye of a user at a predetermined viewing position.

3. The hand retroviewer of claim 2 wherein said eyepiece is secured to said head to position the eye of a user along a viewing axis at an angle of divergence from the illumination axis defined by said lamp, said lens and said beam splitter of from 0.2° to 2°.

4. The hand retroviewer of claim 3 wherein said divergence angle is 0.4° to 0.6°.

5. The hand retroviewer of claim 4 wherein the viewing position defined by said eyepiece is spaced the same distance from said beam splitter as is the virtual image of the light source.

6. The hand retroviewer of claim 2 wherein the viewing position defined by said eyepiece is spaced the same distance from said beam splitter as is the virtual image of the light source.

7. The hand retroviewer of claim 6 wherein the speed of said condensing lens is greater than $f/2$.

8. The hand retroviewer of claim 7 including a source of electrical energy for said lamp in said body of said housing.

* * * * *